US012686370B2

(12) United States Patent
Kim

(10) Patent No.: US 12,686,370 B2
(45) Date of Patent: Jul. 21, 2026

(54) ELECTRONIC PARKING BRAKE SYSTEM AND METHOD OF CONTROLLING THE SAME

(71) Applicant: HL MANDO CORPORATION, Pyeongtaek-si (KR)

(72) Inventor: Bitnuri Kim, Hwaseong-si (KR)

(73) Assignee: HL MANDO CORPORATION, Pyeongtaek si (KR)

( * ) Notice: Subject to any disclaimer, the term of this patent is extended or adjusted under 35 U.S.C. 154(b) by 598 days.

(21) Appl. No.: 17/898,969

(22) Filed: Aug. 30, 2022

(65) Prior Publication Data

US 2023/0064663 A1 Mar. 2, 2023

(30) Foreign Application Priority Data

Aug. 31, 2021 (KR) ......................... 10-2021-0115650

(51) Int. Cl.
 *B60T 8/171* (2006.01)
 *B60Q 9/00* (2006.01)
 *B60T 13/74* (2006.01)

(52) U.S. Cl.
 CPC ................ *B60T 8/171* (2013.01); *B60Q 9/00* (2013.01); *B60T 13/746* (2013.01)

(58) Field of Classification Search
 CPC .......... B60T 8/171; B60T 13/746; B60Q 9/00
 See application file for complete search history.

(56) References Cited

U.S. PATENT DOCUMENTS

| | | | |
|---|---|---|---|
| 2014/0149012 A1* | 5/2014 | Shiraki | B60T 13/741 701/70 |
| 2016/0221547 A1* | 8/2016 | No | B60T 13/74 |
| 2016/0304069 A1* | 10/2016 | Choi | B60T 8/3205 |

(Continued)

FOREIGN PATENT DOCUMENTS

| | | | | |
|---|---|---|---|---|
| CN | 111746296 A | * | 10/2020 | |
| KR | 20190002058 A | * | 1/2019 | |
| WO | WO-2021137528 A1 | * | 7/2021 | B62D 15/0245 |

OTHER PUBLICATIONS

Translation of WO2021137528A1 (Year: 2021).*

(Continued)

*Primary Examiner* — Abdalla A Khaled
(74) *Attorney, Agent, or Firm* — LEE, HONG, DEGERMAN, KANG & WAIMEY

(57) ABSTRACT

Provided is an electronic parking brake (EPB) system including an actuator of an EPB operated by a motor, the EPB system including: a motor driving unit configured to drive the motor; and a controller electrically connected to the motor driving unit, wherein the controller is configured to: in response to a parking switch being in an activated state, determine whether an engine is in an off state; upon determining that the engine is in the off state and operation information of the EPB is parking apply information corresponding to a parking apply mode (Apply), determine whether a rolling of the vehicle occurs based on a wheel pulse; upon determining that the rolling of the vehicle occurs, determine whether the rolling corresponds to a driver's steering intention based on external collision information and a steering angle; and upon determining that the rolling corresponds to the driver's steering intention, control the motor driving unit not to re-clamp the EPB.

14 Claims, 10 Drawing Sheets

(56) References Cited

U.S. PATENT DOCUMENTS

| 2017/0174210 A1* | 6/2017 | Choi ..................... B60W 30/08 |
| 2018/0215355 A1* | 8/2018 | Kinder ..................... B60T 7/12 |
| 2019/0293172 A1* | 9/2019 | Shinohara .............. B60K 17/02 |
| 2019/0351909 A1* | 11/2019 | Kook .............. B60W 30/18072 |
| 2020/0198654 A1* | 6/2020 | Eckstein ............ G01C 21/3647 |
| 2020/0232531 A1* | 7/2020 | Robere ................... F16D 66/00 |
| 2020/0317181 A1* | 10/2020 | Sun ........................... B60T 7/12 |
| 2021/0039634 A1* | 2/2021 | Son ..................... B60W 30/085 |
| 2021/0086737 A1* | 3/2021 | Schumann ............ B60T 8/1755 |
| 2022/0009470 A1* | 1/2022 | Lee ...................... B60T 13/741 |
| 2022/0212646 A1* | 7/2022 | Urano .................. B60T 13/588 |

OTHER PUBLICATIONS

Machine translation for KR20190002058A, Park Chong, Jan. 8, 2019.*

Machine translation for CN111746296A, Guo Jinhua, Oct. 9, 2020.*

* cited by examiner

ELECTRONIC PARKING BRAKE SYSTEM AND METHOD OF CONTROLLING THE SAME

CROSS-REFERENCE TO RELATED APPLICATION

This application is based on and claims priority under 35 U.S.C. § 119 to Korean Patent Application No. 10-2021-0115650, filed on Aug. 31, 2021 in the Korean Intellectual Property Office, the disclosure of which is incorporated herein by reference.

BACKGROUND

1. Field

The disclosure relates to an electronic parking brake (EPB) system and a method of controlling the same, and more specifically, to an EPB system capable of accurately generating a re-clamping force of the EPB without applying an excessive load to the EPB, and accurately informing a re-clamping situation of the EPB and a method of controlling the same.

2. Description of the Related Art

In general, an electronic parking brake (EPB) system includes an EPB having a motor and a controller for driving the EPB, and the controller drives the EPB to generate a clamping force required for parking. For example, the EPB system increases a torque generated from a motor through a reducer to generate a clamping force required for parking by a mechanical structure device inside a caliper.

However, the conventional EPB system, in response to a rolling of a vehicle after the EPB is applied, re-clamps the EPB regardless of a steering intention of the driver.

Therefore, the conventional EPB system applies an excessive load to the EPB and fails to accurately generate a re-clamping force of the EPB.

In addition, the conventional EPB system turns on a warning light of an EPB display window regardless of the driver's steering intention, and thus fails to accurately inform a re-clamping situation of the EPB.

RELATED ART DOCUMENT

Patent Document (Patent Document 1) Japanese Patent Application Laid-Open No. 2015-193357 (published on Nov. 5, 2015)

SUMMARY

Therefore, it is an object of the disclosure to provide an electronic parking brake (EPB) system capable of accurately generating a re-clamping force of an EPB without applying an excessive load to the EPB, and a method of controlling the same.

It is another object of the disclosure to provide an EPB system capable of accurately informing a re-clamping situation of an EPB, and a method of controlling the same.

The technical objectives of the disclosure are not limited to the above, and other objectives may become apparent to those of ordinary skill in the art based on the following descriptions.

According to an aspect of the disclosure, there is provided an electronic parking brake (EPB) system including an actuator of an EPB operated by a motor, the EPB system including: a motor driving unit configured to drive the motor; and a controller electrically connected to the motor driving unit, wherein the controller is configured to: in response to a parking switch being in an activated state, determine whether an engine is in an off state; upon determining that the engine is in the off state and operation information of the EPB is parking apply information corresponding to a parking apply mode (Apply), determine whether a rolling of the vehicle occurs based on a wheel pulse; upon determining that the rolling of the vehicle occurs, determine whether the rolling corresponds to a driver's steering intention based on external collision information and a steering angle; and upon determining that the rolling corresponds to the driver's steering intention, control the motor driving unit not to re-clamp the EPB.

The controller may be configured to, upon the rolling of the vehicle occurring, determine whether the external collision information is not received and the steering angle is received, and upon determining that the external collision information is not received and the steering angle is received, determine that the rolling corresponds to the driver's steering intention.

The controller may be configured to, upon determining that the external collision information is not received and the steering angle, which is obtained by a steering wheel manipulation of a driver in a situation of the vehicle rolling in a stationary state, is received, determine that the rolling corresponds to the driver's steering intention.

The controller may be configured to, upon determining that the external collision information is not received and the steering angle, which is obtained by a steering wheel manipulation of a driver in a situation of the vehicle rolling due to a bump on a road, is received, determine that the rolling corresponds to the driver's steering intention.

The controller may be configured to, upon the rolling of the vehicle occurring, determine whether the external collision information is received and the steering angle is received, and upon determining that the external collision information is received and the steering angle is received, determine that the rolling does not correspond to the driver's steering intention the rolling does not correspond to a driver's steering intention.

The controller may be configured to, upon determining that the external collision information is received and the steering angle, which is obtained by a shaking of the vehicle due to an external collision in a situation of the vehicle rolling due to the external collision, is received, determine that the rolling does not correspond to the driver's steering intention.

The controller may be further configured to, upon determining that the rolling corresponds to the driver's steering intention, control an EPB display window provided in a vehicle cluster such that a warning light of the EPB display window is not turned on.

The controller may be configured to, upon determining that the rolling does not correspond to the driver's steering intention, control the motor driving unit to re-clamp the EPB.

The controller may be further configured to, upon determining that the rolling does not correspond to the driver's steering intention, control an EPB display window such that a warning light of the EPB display window is turned on.

According to an aspect of the disclosure, there is provided a method of controlling an electronic parking brake (EPB)

system including an actuator of an EPB operated by a motor, the method including: determining whether a parking switch is activated; upon determining that the parking switch is activated, determine whether an engine is in an off state; upon determining that the engine is in the off state, determining whether operation information of the EPB is parking apply information corresponding to a parking apply mode (Apply); upon determining that the operation information of the EPB is the parking apply information corresponding to the parking apply mode (Apply, determining whether a rolling of the vehicle occurs based on a wheel pulse; upon determining that the rolling of the vehicle occurs, determining whether the rolling corresponds to a driver's steering intention based on external collision information and a steering angle; and upon determining that the rolling corresponds to the driver's steering intention, preventing the EPB from being re-clamped.

The determining of whether the rolling corresponds to a driver's steering intention may include: determining whether the external collision information is not received and the steering angle is received, and upon determining that the external collision information is not received and the steering angle is received, determining that the rolling corresponds to the driver's steering intention.

The determining of whether the rolling corresponds to a driver's steering intention may include, upon determining that the external collision information is not received and the steering angle, which is obtained by a steering wheel manipulation of a driver in a situation of the vehicle rolling in a stationary state, is received, determining that the rolling corresponds to the driver's steering intention.

The determining of whether the rolling corresponds to a driver's steering intention may include, upon determining that the external collision information is not received and the steering angle, which is obtained by a steering wheel manipulation of a driver in a situation of the vehicle rolling due to a bump on a road, is received, determining that the rolling corresponds to the driver's steering intention.

The determining of whether the rolling corresponds to a driver's steering intention may include: determine whether the external collision information is received and the steering angle is received; and upon determining that the external collision information is received and the steering angle is received, determining that the rolling does not correspond to the driver's steering intention.

The determining of whether the rolling corresponds to a driver's steering intention may include, upon determining that the external collision information is received and the steering angle, which is obtained by a shaking of the vehicle due to an external collision in a situation of the vehicle rolling due to the external collision, is received, determining that the rolling does not correspond to the driver's steering intention.

The method may further include, upon determining that the rolling corresponds to the driver's steering intention, preventing a warning light of an EPB display window provided in a vehicle cluster from being turned on.

The method may further include, upon determining that the rolling does not correspond to the driver's steering intention, allowing the EPB to be re-clamped.

The method may further include, upon determining that the rolling does not correspond to the driver's steering intention, allowing a warning light of an EPB display window provided in a vehicle cluster to be turned on.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
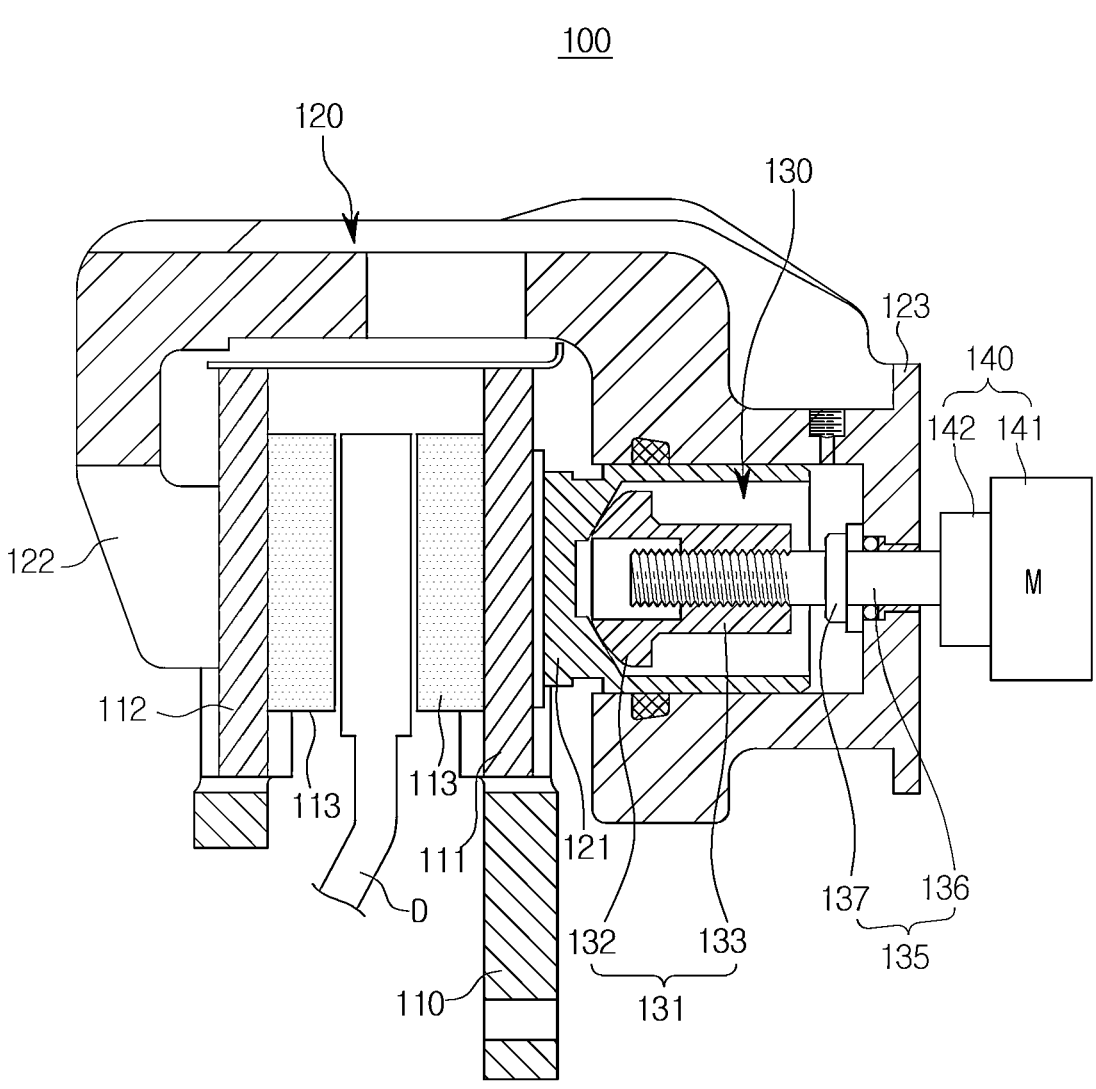
FIG. 1 illustrates a configuration of an EPB included in an EPB system according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

FIG. 1 illustrates a configuration of an EPB included in an EPB system according to an embodiment.

Referring to FIG. 1, an EPB 100 may include a carrier 110 in which a pair of pad plates 111 and 112 are installed to move forward and backward to pressurize a brake disk D rotating together with a vehicle wheel, a caliper housing 120 slidably installed on the carrier 110 and provided with a cylinder 123 in which a piston 121 is installed to advance and retreat by braking hydraulic pressure, a power conversion unit 130 that pressurizes the piston 121, and a motor actuator 140 that transmits rotational force to the power conversion unit 130 using a motor 141.

The pair of pad plates 111 and 112 is divided into an inner pad plate 111 disposed to contact the piston 121 and an outer pad plate 112 disposed to contact a finger portion 122 of the caliper housing 120. The pair of pad plates 111 and 112 are installed on the carrier 110 fixed to the vehicle body so as to advance and retreat toward both sides of the brake disk D. In addition, a brake pad 113 is attached to one surface of each of the pad plates 111 and 112 facing the brake disk D.

The caliper housing 120 is slidably installed on the carrier 110. In more detail, the caliper housing 120 may include the cylinder 123 in which the power conversion unit 130 is installed at the rear portion thereof and the piston 121 is included to be movable forward and backward, and the finger portion 122 formed to be bent in a downward direction to operate the outer pad plate 112 in the front portion. The finger portion 122 and the cylinder 123 are formed integrally.

The piston 121 is provided in a cylindrical shape having a cup shape and is inserted into the cylinder 123 so as to be slidable. The piston 121 presses the inner pad plate 111 toward the brake disk D by the axial force of the power conversion unit 130 receiving the rotational force of an EPB actuator 140. Accordingly, when the axial force of the power conversion unit 130 is applied, the piston 121 advances toward the inner pad plate 111 to press the inner pad plate 111, and the caliper housing 120 operates in a direction opposite to the piston 121 by reaction force, so that the finger portion 122 presses the outer pad plate 112 toward the brake disk D to perform braking.

The power conversion unit 130 may serve to press the piston 121 toward the inner pad plate 111 by receiving rotational force from the actuator 140.

The power conversion unit 130 may include a nut member 131 installed so as to be disposed in the piston 121 and coming in contact with the piston 121, and a spindle member 135 screwed to the nut member 131.

The nut member 131 may be disposed in the piston 121 in a state in which rotation is restricted, and may be screwed with the spindle member 135.

The nut member 131 may be formed by a head portion 132 provided to come into contact with the piston 121, and a coupling portion 133 formed extending from the head portion 132 and having a female thread formed on the inner circumferential surface thereof to be screwed with the spindle member 135.

The nut member 131 may move in a forward direction or a backward direction according to the rotation direction of the spindle member 135 and may serve to pressurize and release the piston 121. In this case, the forward direction may be a moving direction in which the nut member 131 approaches the piston 121. The backward direction may be a direction in which the nut member 131 moves away from the piston 121. In addition, the forward direction may be a moving direction in which the piston 121 approaches the brake pad 113. The backward direction may be a direction in which the piston 121 moves away from the brake pad 113.

The spindle member 135 may include a shaft portion 136 that passes through a rear portion of the caliper housing 120 and rotates by receiving the rotational force of the EPB actuator 140, and a flange portion 137 extending in the radial direction from the shaft portion 136. One side of the shaft portion 136 may be rotatably installed by passing through the rear side of the cylinder 123, and the other side may be disposed in the piston 121. In this case, the one side of the shaft portion 136 passing through the cylinder 123 is connected to the output shaft of the reducer 142 to receive the rotational force of the actuator 140.

The actuator 140 may include the motor 141 and the reducer 142.

The motor 141 may pressurize or release the piston 121 by moving the nut member 131 forward and backward by rotating the spindle member 135.

The reducer 142 may be provided between the output side of the motor 141 and the spindle member 135.

By having the above configuration, the EPB 100 may rotate the spindle member 135 in one direction using the actuator 140 in a parking apply mode to move the nut member 131 so that the piston 121 is pressurized. The piston 121 pressed by the movement of the nut member 131 presses the inner pad plate 111 to bring the brake pad 113 into close contact with the brake disk D, thereby generating a clamping force.

In addition, the EPB 100 may rotate the spindle member 135 in the opposite direction using the actuator 140 in a parking release mode to retreat, the nut member 131 pressed against the piston 121. The retreat movement of the nut member 131 causes the pressure on the piston 121 to be released. When the pressure on the piston 121 is released, the brake pad 113 is separated from the brake disk D, so that the clamping force may be released.

Figure 2:
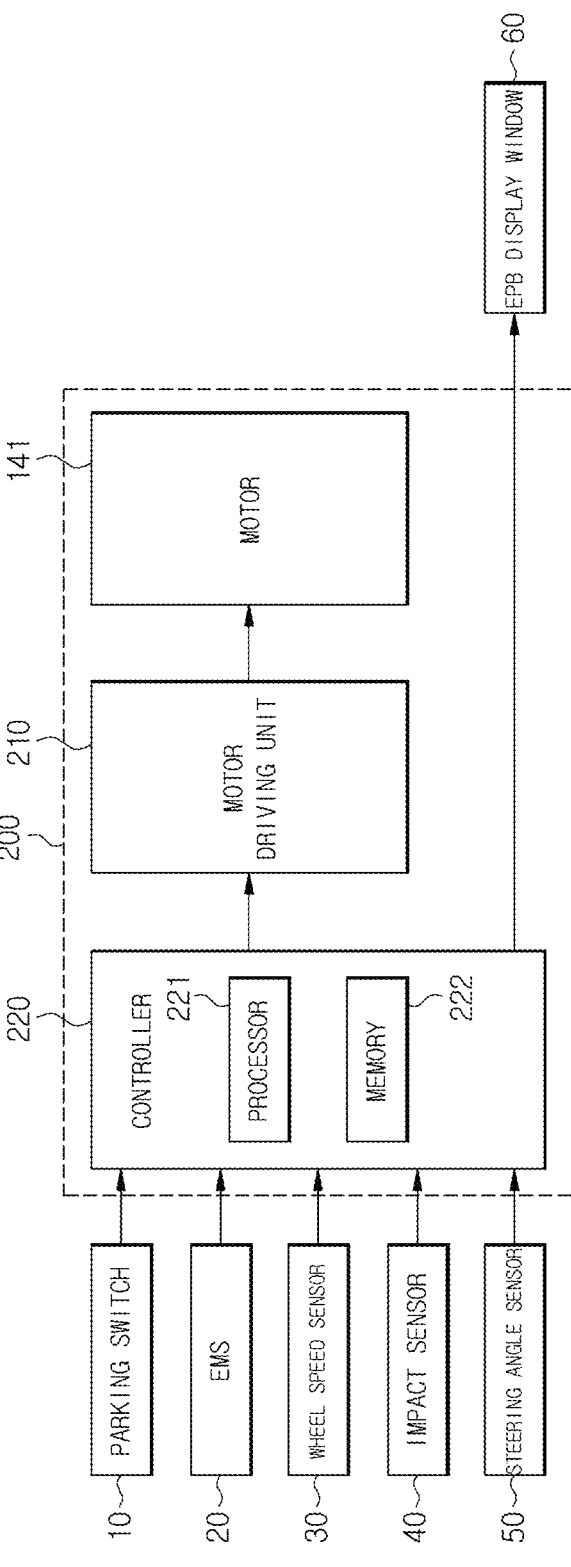
FIG. 2 illustrates a configuration of an EBP system according to an embodiment.

FIG. 2 illustrates a configuration of a brake system according to an embodiment.

Referring to FIG. 2, the EPB system 200 may include a motor 141, a motor driving unit 210, and a controller 220. The controller 220 may be electrically connected to a parking switch 10, an engine management system (EMS) 20, a wheel speed sensor 30, an impact sensor 40, and a steering angle sensor 50.

The parking switch 10 may, upon being manipulated to an on-state by the driver, transmit a parking apply signal for parking apply (Apply) of the EPB 100 to the controller 220, and upon being manipulated to an off-state by the driver, transmit a parking release signal for parking release (Release) of the EPB 100 to the controller 220. According to the manipulation state of the parking switch 10, the EPB 100 may be changed to a parking apply state or a parking release state.

The EMS 20 may control the torque of the engine in response to a driver's intention to accelerate through an accelerator pedal or a request from a driver assistance system. The EMS 20 may be configured to, in response to the parking switch 10 being activated, transmit engine state information to the controller 220. For example, the engine state information may include engine off information indicating that the engine is in an off state, engine on information indicating that the engine is on state, and the like.

The wheel speed sensor 30 may detect a wheel speed and a heading direction of the vehicle. The wheel speed sensor 30 may output a wheel pulse whose frequency increases in proportion to the speed of the vehicle. The wheel speed sensor 30 may transmit the output wheel pulse to the controller 220.

The impact sensor 40 may, upon an external impact or vibration being applied to the vehicle, detect an external impact or vibration. For example, when another vehicle collides with the host vehicle or when another person pushes the host vehicle, the impact sensor 40 may detect a state of colliding with another vehicle or a state of the vehicle being pushed by another person. The impact sensor 40 may transmit external impact information corresponding to the state of colliding with another vehicle or the state of the vehicle being pushed by another person to the controller 220. Instead of the impact sensor 40, a gravity (G) sensor or an acceleration sensor may detect a change in vehicle movement and speed when an external impact or vibration is applied.

The steering angle sensor 50 may detect a rotation angle and a rotation angular velocity by the driver's manipulation of the steering wheel. The steering angle sensor 50 may transmit the rotation angle and the rotation angular velocity by the driver's manipulation of the steering wheel to the controller 220.

The motor driving unit 210 may drive the motor 141. The motor driving unit 210 may drive the motor 141 in a forward rotation direction or a reverse rotation direction. For example, the motor driving unit 210 may include an H-Bridge circuit including a plurality of power switching elements configured to drive the motor 141 in a forward rotation direction or a reverse rotation direction.

The controller 220 may perform a parking apply mode or a parking release mode according to a manipulation signal of the parking switch 10 manipulated by the driver or a manipulation signal generated by a program related to operation of the EPB.

The controller 220 may, in the parking apply mode, rotate the motor 141 in one direction to move the nut member 131 in the forward direction to press the piston 121 so that the brake pad 113 is bought into close contact with the brake disk D to perform a parking apply operation that generates a clamping force.

The controller 220 may, in the parking release mode, rotate the motor 141 in the opposite direction to move the nut member 131 in the reverse direction to release the pressed piston 121, so that the brake pad 113 in close contact with the brake disk D is released to perform a parking release operation that releases the clamping force.

The EPB system 200 according to an embodiment may be configured to, upon a rolling of the vehicle occurring after the EPB is clamped, determine whether the rolling corresponds to a driver's steering intention based on the external impact information and the steering angle, and upon determining that the rolling corresponds to a driver's steering intention, prevent the EPB from being re-clamped and upon determining that the rolling does not correspond to a driver's steering intention, allow the EPB to be re-clamped, so that the re-clamping force of the EPB is accurately generated without applying an excessive load to the EPB. In this case, the EPB system 200 clamps the EPB when the rolling of the vehicle occurs, and re-clamps the EPB when the rolling of the vehicle occurs again after the clamping of the EPB. The condition for re-clamping of the EPB system 200 may use an activated state of the parking switch, an engine off state, a slope state, an actuator apply state corresponding to a parking apply mode, which is associated with parking apply information, a wheel pulse output from the wheel speed sensor, external impact information, an steering angle, and the like.

The EPB system 200 according to an embodiment may be configured to, in response to a rolling of the vehicle occurring after a clamping of the EPB, determine whether the rolling corresponds to a driver's steering intention based on the external impact information and the steering angle, and upon determining that the rolling corresponds to a driver's steering intention, prevent a warning light of an EPB display window from being turned on, and upon determining that the rolling corresponds to a driver's steering intention, allow the warning light of the EPB display window to be turned on, to accurately inform a re-clamping situation of the EPB.

The controller 220 may include a processor 221 and a memory 222.

The processor 221 may determine whether the parking switch 10 is in an activated state. The processor 221 may, in response to the parking switch 10 being turned on by a manipulation of the driver, receive a parking apply signal for parking apply of the EPB 100 from the parking switch 10. The processor 221 may, upon receiving the parking apply signal, determine that the parking switch 10 is in an activated state.

The processor 221 may, upon determining that the parking switch 10 is in the activated state, determine whether the engine is in an off state. The processor 221 may, upon determining that the parking switch 10 is in the activated state, determine whether engine off information, which corresponds to an engine off state, is received from the EMS 20 that controls the engine, in order to determine whether to perform re-clamping on the EPB 100. The processor 221 may, upon receiving the engine off information, determine that the engine is in an off state.

The processor 221 may, upon determining that the engine is in an off state, determine whether operation information of the EPB 100 is parking apply information corresponding to a parking apply mode. The processor 221 may check operation information of the EPB 100 stored in the memory 222 in order to whether to perform re-clamping on the EPB 100. The operation information of the EPB 100 may include parking apply information corresponding to a parking apply mode and parking release information corresponding to a parking release mode. For example, the memory 222 may be an electrically erasable ROM (EEPROM) in which internal data is erased by an electrical signal applied to one pin of a chip.

The processor 221 may, upon the operation information of the EPB 100 being determined as parking apply information corresponding to the parking apply mode, may receive a wheel pulse output from the wheel speed sensor 30. The processor 221 may determine whether a rolling of the vehicle occurs based on the received wheel pulse. The processor 221 may determine whether the rolling of the vehicle occurs on a slope based on the received wheel pulse. The processor 221 may receive slope information input or estimated from another system in the vehicle performing CAN communication, or may receive slope information detected through a slope sensor instead of receiving slope information input or estimated from another system in the vehicle. The processor 221 may receive slope information by requesting cooperation from an electronic stability control (ESC) controller, which is another system in the vehicle.

Figure 3:
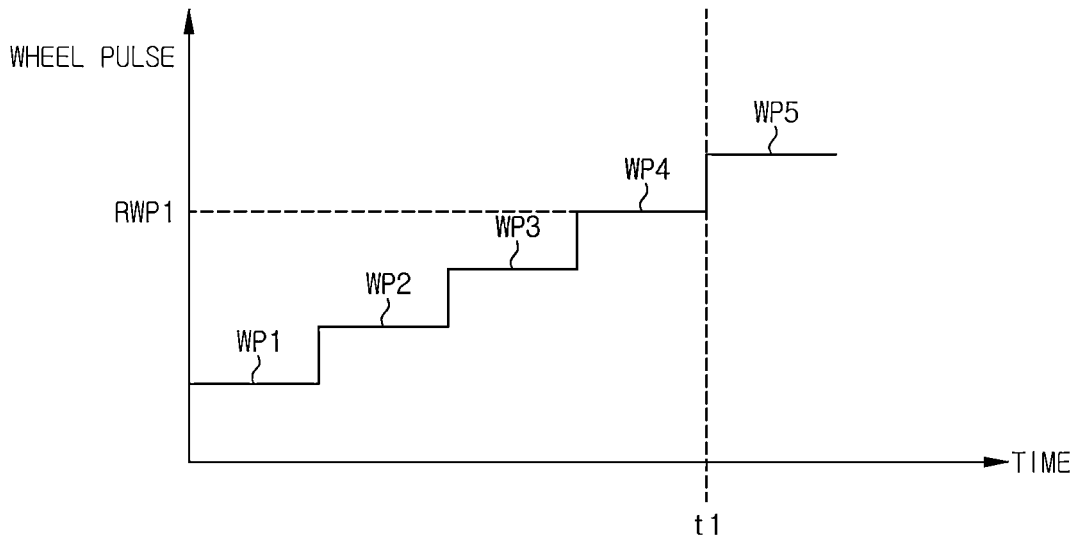
FIG. 3 illustrates an example of receiving a wheel pulse of a wheel speed sensor in an EPB system according to an embodiment.

FIG. 3 illustrates an example of receiving a wheel pulse of a wheel speed sensor in an EPB system according to an embodiment.

Referring to FIG. 3, the processor 221 may continuously receive wheel pulses WP1, WP2, WP3, WP4, and WP5 accumulated over time from the wheel speed sensor 30. The processor 221 may, based on the received accumulated wheel pulse WP5 being greater than a predetermined reference wheel pulse RWP1, determine that a rolling of the vehicle occurs. The processor 221 may determine that the rolling of the vehicle occurs at a time t1. The processor 221 may receive a wheel speed or a wheel pulse from another system in the vehicle performing CAN communication instead of the wheel speed sensor 30. The processor 221 may receive a wheel speed or a wheel pulse by requesting cooperation from an ESC controller, which is another system in the vehicle.

Without being limited thereto, the processor 221 may, upon determining that the operation information of the EPB 100 is parking apply information corresponding to the parking apply mode, receive a longitudinal acceleration. The processor 221 may receive the longitudinal acceleration output from a longitudinal acceleration sensor. The processor 221 may determine whether a rolling of the vehicle occurs based on the received longitudinal acceleration. The processor 221 may, upon determining that the received longitudinal acceleration being greater than a predetermined reference acceleration, determine that a rolling of the vehicle occurs. The processor 221 may receive the longitudinal acceleration from another system in the vehicle performing CAN communication instead of the longitudinal accelera- tion sensor. The processor 221 may receive the longitudinal acceleration by requesting cooperation from the ESC controller, which is another system in the vehicle.

Figure 4:
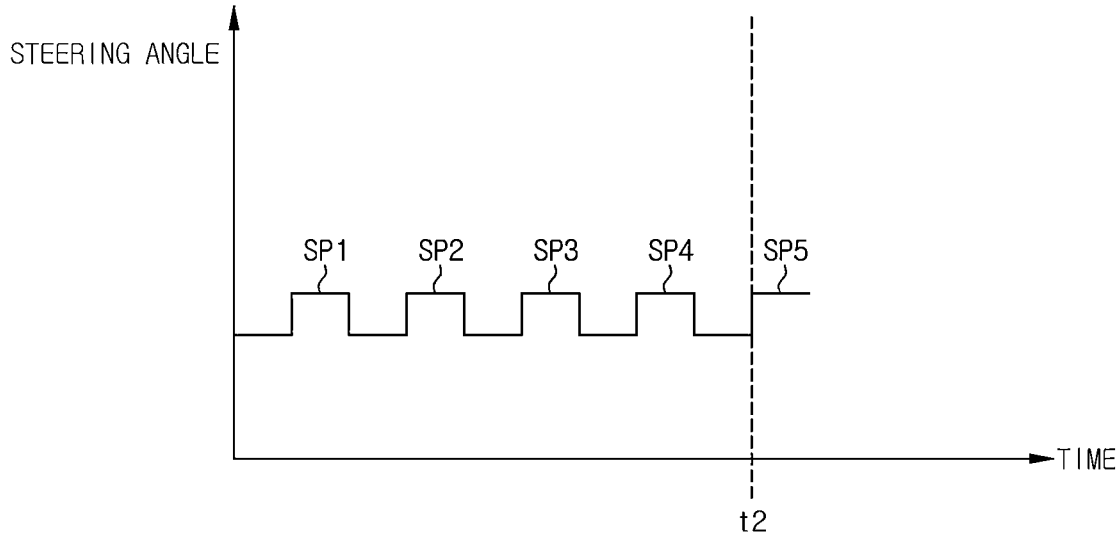
FIG. 4 illustrates an example of receiving a steering angle pulse of a steering angle sensor in an EPB system according to an embodiment.

FIG. 4 illustrates an example of receiving a steering angle pulse of a steering angle sensor in an EPB system according to an embodiment.

Referring to FIG. 4, the processor 221 may periodically receive constant steering angle pulses SP1, SP2, SP3, SP4, and SP5 over time from the steering angle sensor 50. The processor 221 may, upon receiving the steering angle pulse SP5 reaching at a predetermined time t2, determine that a rolling of the vehicle occurs. The steering angle sensor 50 may, upon a rolling of the vehicle 1 occurring, generate periodic pulses of the steering angle SP1, SP2, SP3, SP4, and SP5. The processor 221 may determine that a rolling of the vehicle occurs at a time t2. The processor 221 may receive a steering angle pulse from another system in the vehicle performing CAN communication instead of the steering angle sensor 50. The processor 221 may receive a steering angle pulse by requesting cooperation from the ESC controller, which is another system in the vehicle.

The processor 221 may, upon occurrence of a rolling of the vehicle, determine whether external impact information has been received. When an external impact or vibration is applied to the vehicle, the processor 221 may receive external impact information corresponding to a state of colliding with another vehicle or a state of the vehicle being pushed by another person from the impact sensor 40. The processor 221 may receive the external impact information from another system in the vehicle that performs CAN communication instead of the impact sensor 40.

The processor 221 may receive external impact information by requesting cooperation from the ESC controller, which is another system in the vehicle.

The processor 221 may, upon a rolling of the vehicle occurring, determine whether a steering angle has been received. The processor 221 may receive a steering angle obtained by the driver's manipulation of a steering wheel or a steering angle obtained by shaking of the vehicle due to an external impact, from the steering angle sensor 50. The processor 221 may receive a steering angle obtained by the driver's manipulation of a steering wheel or a steering angle obtained by shaking of the vehicle due to an external impact from another system in the vehicle that performs CAN communication instead of the steering angle sensor 50. The processor 221 may request cooperation from the ESC con- troller, which is another system in the vehicle, to receive a steering angle obtained by the driver's manipulation of a steering wheel or a steering angle obtained by shaking of the vehicle due to an external impact.

The processor 221 may determine whether the rolling corresponds to a driver's steering intention based on the received external impact information and steering angle. The processor 221 may, upon determining that the steering angle is received without receiving the external impact information, determine that the rolling corresponds to a driver's steering intention.

For example, the processor 221 may be configured to, upon determining that the steering angle, which is obtained by a steering wheel manipulation of the driver in a situation of the vehicle rolling in a stationary state, is received without receiving the external collision information, determine that the rolling corresponds to a driver's steering intention. The processor 221 may be configured to, upon determining that the steering angle, which corresponds to a steering wheel manipulation of the driver in a situation of the vehicle rolling in a stationary state, is received from the steering sensor 50 without receiving the external collision information, deter- mine that the rolling corresponds to a driver's steering intention.

As another example, the processor 221 may be configured to, upon determining that the steering angle, which is obtained by a steering wheel manipulation of the driver in a situation of the vehicle rolling due to a bump on a road, is received without receiving the external collision informa- tion, determine that the rolling corresponds to a driver's steering intention. The processor 221 may be configured to, upon determining that the steering angle, which corresponds to a steering wheel manipulation of the driver in a situation of the vehicle rolling due to a bump on a road, is received from the steering angle sensor 50 without receiving the external collision information, determine that the rolling corresponds to a driver's steering intention.

The processor 221 may be configured to, upon determin- ing that the steering angle, which is obtained by a steering wheel manipulation of the driver during rolling of the vehicle caused by a bump on a road, is received without receiving the external collision information, determine that the rolling corresponds to a driver's steering intention. The processor 221 may be further configured to, upon determin- ing that the rolling corresponds to a driver's steering inten- tion, control the EPB display window 60 such that the warning light of the EPB display window 60 provided in the vehicle cluster is not turned on. The processor 221 may transmit a non-lighting signal for not turning on the warning light of the EPB display window 60 to the EPB display window 60, and the EPB display window 60 receiving the non-lighting signal may not turn on the warning light.

The processor 221 may be configured to, upon determin- ing that the rolling corresponds to a driver's steering inten- tion, control the motor driving unit 210 not to re-clamp the EPB 100. The motor driving unit 210 may stop the driving of the motor 141 to stop the re-clamp operation of the EPB 100.

The processor 221 may determine again whether a driv- er's steering intention is absent for a predetermined period of time. The processor 221 may, upon receiving no steering angle obtained by the driver's manipulation of the steering wheel for a predetermined period of time from the steering angle sensor 50, determine that a driver's steering intention is absent for the predetermined period of time.

The processor 221 may, upon determining that a driver's steering intention is absent for the predetermined period of time, transmit a lighting signal for turning on the warning light of the EPB display window 60 to the EPB display window 60. The EPB display window 60 receiving the lighting signal may turn on the warning light. The EPB display window 60 may, upon continuous absence of the driver's steering intention for the predetermined period of time, turn on the warning light.

The processor 221 may, upon continuous absence of the driver's steering intention for the predetermined period of time, control the motor driving unit 210 to re-clamp the EPB 100. The processor 221 may transmit a motor driving signal for re-clamping the EPB 100 to the motor driving unit 210, and the motor driving unit 210 may drive the motor 141 to re-clamp the EPB 100 based on the motor driving signal. The EPB 100 may generate a re-clamping force according to the driving of the motor 141.

The processor 221 may, upon determining that the external collision information is received and the steering angle, determine that the rolling does not correspond to a driver's steering intention.

Figure 5:
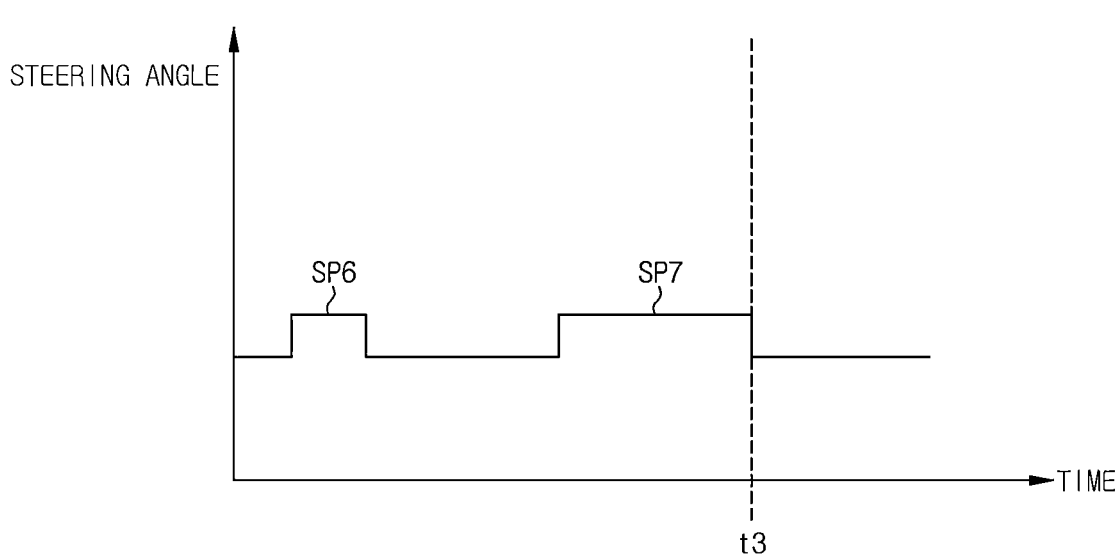
FIG. 5 illustrates another example of receiving a steering angle pulse of a steering angle sensor in an EPB system according to an embodiment.

FIG. 5 illustrates another example of receiving a steering angle pulse of a steering angle sensor in an EPB system according to an embodiment.

Referring to FIG. 5, the processor 221 may receive steering angle pulses SP6 and SP7 that are not constant over time from the steering angle sensor 50. The processor 221 may determine that the steering angle pulse SP7, which has a magnitude larger than that of the steering angle pulse SP6, as corresponding to a steering angle caused by shaking of the vehicle due to an external impact, and determine that the rolling does not correspond to a driver's steering intention.

For example, the processor 221 may be configured to, upon determining that the external collision information is received and the steering angle, which is obtained by a shaking of the vehicle due to an external collision in a situation of the vehicle rolling due to the external collision, is received, determine that the rolling does not correspond to a driver's steering intention. The processor 221 may be configured to, upon determining that a steering angle pulse of SP7 is received from the steering angle sensor 50 as the steering wheel is manipulated by a shaking of the vehicle due to an external collision in a situation of the vehicle rolling due to the external collision, determine that the rolling does not correspond to a driver's steering intention.

The processor 221 may be further configured to, upon determining that the rolling does not correspond to a driver's steering intention, control the EPB display window 60 such that the warning light of the EPB display window 60 provided in the vehicle cluster is turned on. The processor 221 may transmit a lighting signal for turning on the warning light of the EPB display window 60 to the EPB display window 60, and the EPB display window 60 receiving the lighting signal may turn on the warning light.

The processor 221 may be further configured to, upon determining that the rolling does not correspond to a driver's steering intention, control the motor driving unit 210 to re-clamp the EPB 100. The processor 221 may control the motor driving unit 210 to re-clamp the EPB 100 at a time t3. The processor 221 may transmit a motor driving signal for re-clamping the EPB 100 to the motor driving unit 210, and the motor driving unit 210 may drive the motor 141 to re-clamp the EPB 100 based on the motor driving signal. The EPB 100 may generate a re-clamping force according to the driving of the motor 141.

The processor 221 may include a digital signal processor that processes manipulation information of the parking switch 10, engine state information, wheel pulses, external impact information, and steering angles.

The processor 221 may include a micro control unit (MCU) that generates a motor drive signal for re-clamping or not re-clamping the EPB 100, a non-lighting signal for not turning on the warning light of the EPB display window 60, and a lighting signal for turning on the warning light of the warning light of the EPB display window 60.

The memory 222 may store programs and/or data for the processor 221 to process the manipulation information of the parking switch 10, the engine state information, the wheel pulses, the external impact information, and the steering angles, programs and/or data for the processor 221 to generate a motor drive signal for re-clamping or not re-clamping the EPB 100, programs and/or data for the processor 221 to generate a non-lighting signal for not turning on the warning light of the EPB display window 60, and programs and/or data for the processor 221 to generate a lighting signal for turning on the warning light of the warning light of the EPB display window 60.

The memory 222 may temporarily memorize the manipulation information of the parking switch 10, the engine state information, the wheel pulses, the external impact information, and the steering angles, and temporarily memorize a result of processing the manipulation information of the parking switch 10, the engine state information, the wheel pulses, the external impact information, and the steering angles by the processor 221.

The memory 222 may include not only volatile memories, such as S-RAM and D-RAM, but also non-volatile memories, such as a flash memory, a read-only memory (ROM), an erasable programmable read only memory (EPROM), etc.

Figure 6:
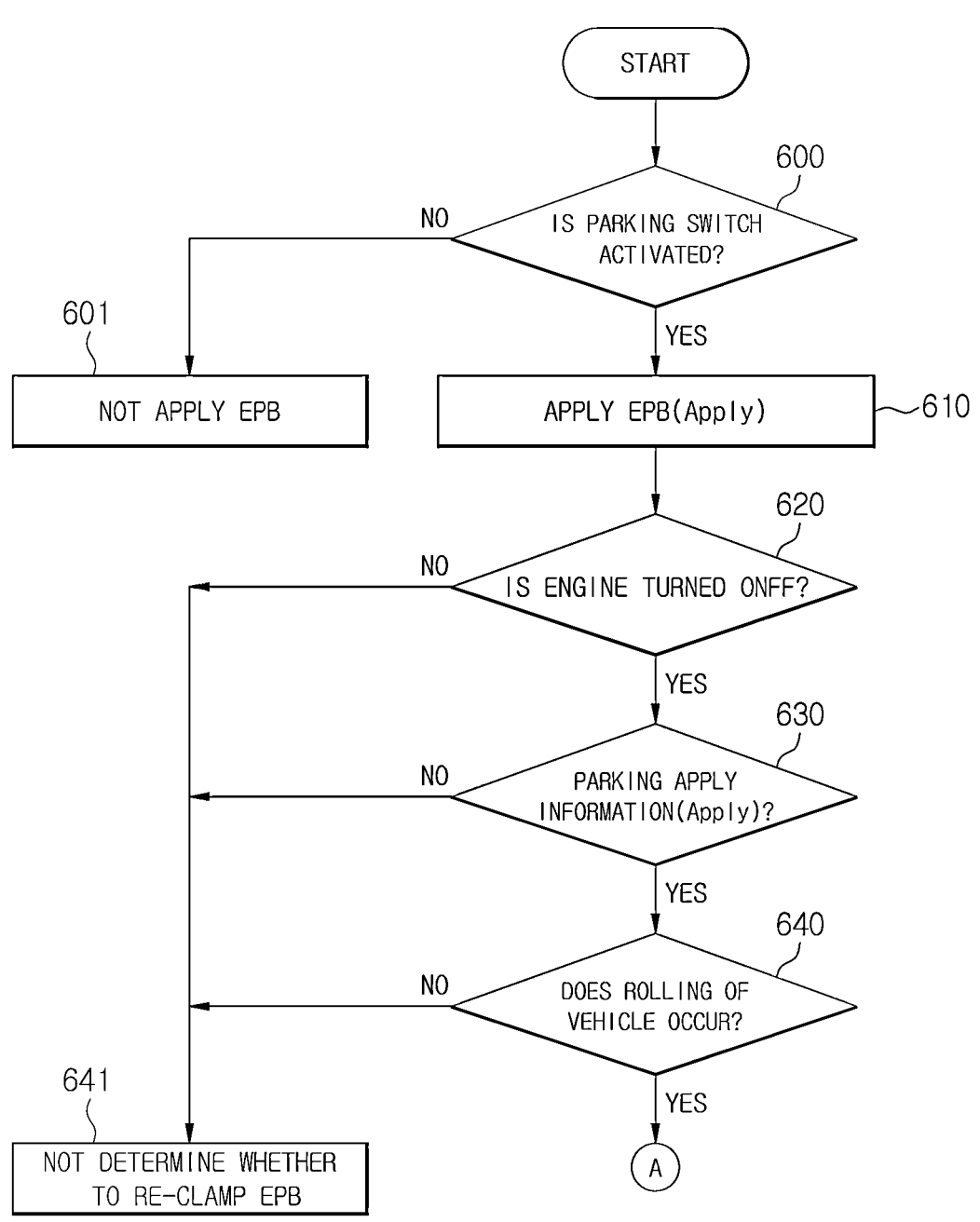
FIGS. 6 and 7 illustrate an example of a method of controlling an EPB system according to an embodiment.
Figure 7:
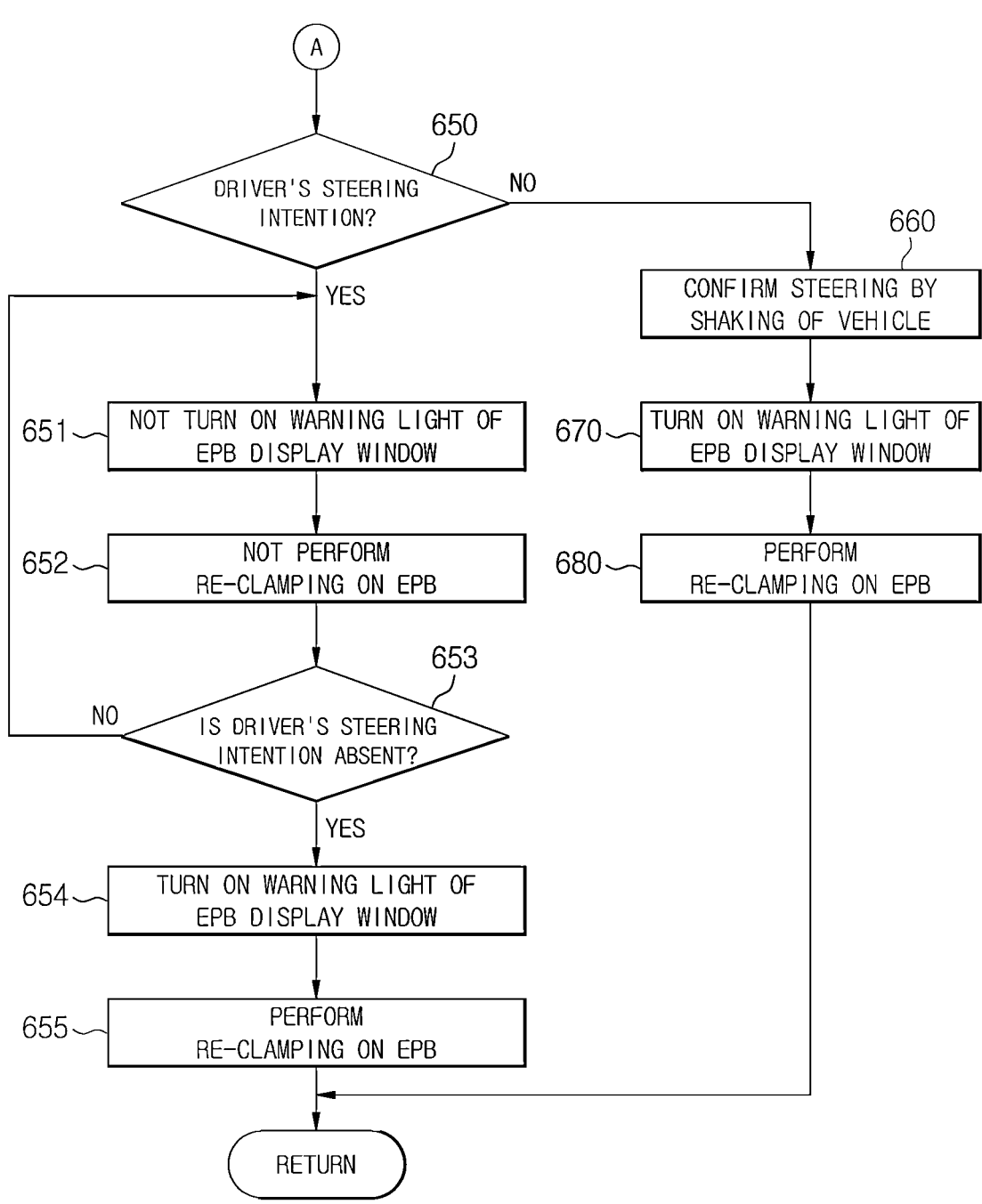

FIGS. 6 and 7 illustrate an example of a method of controlling an EPB system according to an embodiment.

Referring to FIG. 6, the controller 220 may determine whether the driver operates the parking switch 10 (600). The controller 220 may, upon the parking switch 10 being turned on by the driver, receive a parking apply signal for parking apply (Apply) of the EPB 100 from the parking switch 10. The controller 220 may, upon receiving the parking apply signal, determine that the parking switch 10 is in an activated state.

The controller 220 may, upon determined that the parking switch 10 is in the activated state (YES in operation 600), perform a parking apply on the EPB 100 (610). The controller 220 may rotate the motor 141 of the EPB actuator 140 in one direction through the motor driving unit 210 so that the inner pad plate 111 pressed by the piston 121 moves and the friction pad 113 is brought into close contact with the disk D to perform a parking apply mode that provides a braking force. The controller 220 may transmit a motor driving signal for perform parking apply on the EPB 100 to the motor driving unit 210, and the motor driving unit 210 may drive the motor 141 to perform parking apply on the EPB 100 based on the motor driving signal. The EPB 100 may generate a clamping force according to the driving of the motor 141.

Meanwhile, the controller 220 may, upon determining that the parking switch 10 is not in the activated state (NO in operation 600), not perform parking apply on the EPB 100 (601).

The controller 220 may, upon determining that the parking switch 10 is in the activated state (YES in operation 600), determine whether the engine is in an off state (620). The controller 220 may, upon determining that the parking switch 10 is in the activated state (YES in operation 600), determine whether engine off information, which corresponds to an engine off state, is received from the EMS 20 that controls the engine, in order to determine whether to perform re-clamping on the EPB 100. The controller 220 may, upon receiving the engine off information, determine that the engine is in an off state. On the other hand, the controller 220 may, upon determining in operation 620 that the engine is not in the off state (NO in operation 620), not determine whether to perform re-clamping on the EPB 100 (641).

The controller 220 may, upon determining that the engine is in the off state, determine whether operation information of the EPB 100 is parking apply information corresponding to a parking apply mode (630). The controller 220 may check operation information of the EPB 100 stored in the memory 222, in order to whether to perform re-clamping on the EPB 100. The operation information of the EPB 100 may include parking apply information corresponding to a parking apply mode and parking release information corresponding to a parking release mode. On the other hand, the controller 220 may, upon determining in operation 630 that the operation information of the EPB 100 is not the parking apply information corresponding to the parking apply mode (NO in operation 630), not determine whether to perform re-clamping on the EPB 100 (641).

The controller 220 may, upon determining that the operation information of the EPB 100 is the parking apply information corresponding to the parking apply mode (YES in operation 630), determine whether a rolling of the vehicle occurs (640). The controller 220 may determine whether a rolling of the vehicle occurs on a slope based on received wheel pulses. The controller 220 may continuously receive wheel pulses WP1, WP2, WP3, WP4, and WP5 accumulated over time from the wheel speed sensor 30. The controller 220 may, based on the received accumulated wheel pulse (WP5 in FIG. 3) being greater than a predetermined reference wheel pulse (RWP1 in FIG. 3), determine that a rolling of the vehicle occurs at a time t1. The controller 220 may determine whether a rolling of the vehicle occurs on a slope based on received steering angle pulses. The controller 220 may periodically receive constant steering angle pulses SP1, SP2, SP3, SP4, and SP5 over time from the steering angle sensor 50. The controller 220 may, upon receiving the steering angle pulse (SP5 in FIG. 4) reaching at a predetermined time t2, determine that a rolling of the vehicle occurs at the time t2. Meanwhile, the controller 220 may, upon determining in operation 640 that a rolling of the vehicle does not occur (NO in operation 640), not determine whether to perform re-clamping on the EPB 100 (641).

Referring to FIG. 7, the controller 220 may, upon a rolling of the vehicle occurring (YES in operation 640), determine whether the rolling corresponds to a driver's steering intention based on received external impact information and steering angle (650). When an external impact or vibration is applied to the vehicle, the controller 220 may receive external impact information corresponding to a state of colliding with another vehicle or a state of the vehicle being pushed by another person from the impact sensor 40. The controller 220 may receive a steering angle obtained by the driver's manipulation of a steering wheel or a steering angle obtained by shaking of the vehicle due to an external impact, from the steering angle sensor 50.

The controller 220 may determine whether the rolling corresponds to a driver's steering intention, based on the received external impact information and steering angle. The controller 220 may, upon determining that the steering angle is received without receiving the external impact information, determine that the rolling corresponds to a driver's steering intention.

Figure 8:
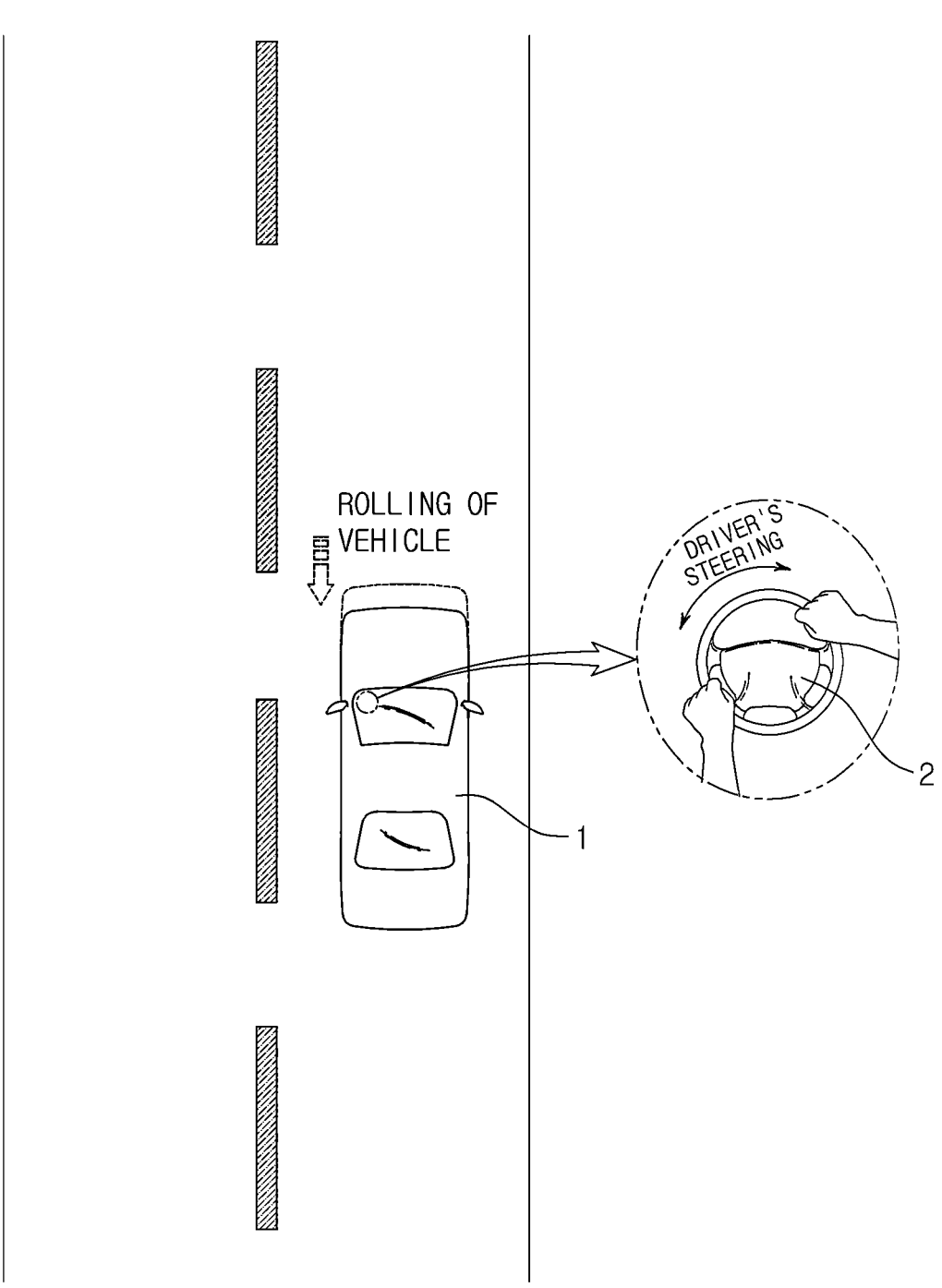
FIG. 8 illustrates an example that a driver's steering intention is confirmed in an electronic EPB system according to an embodiment.

FIG. 8 illustrates an example that a driver's steering intention is confirmed in an electronic EPB system according to an embodiment.

Referring to FIG. 8, the controller 220 may be configured to, upon determining that the steering angle, which is obtained by a driver manipulation of the steering wheel 2 in a situation of the vehicle 1 rolling in a stationary state, is received without receiving the external collision information, determine that the rolling corresponds to a driver's steering intention. The controller 220 may be configured to, upon determining that the steering angle, which corresponds to a driver manipulation of the steering wheel 2 in a situation of the vehicle 1 rolling in a stationary state, is received from the steering sensor 50, determine that the rolling corresponds to a driver's steering intention.

Figure 9:
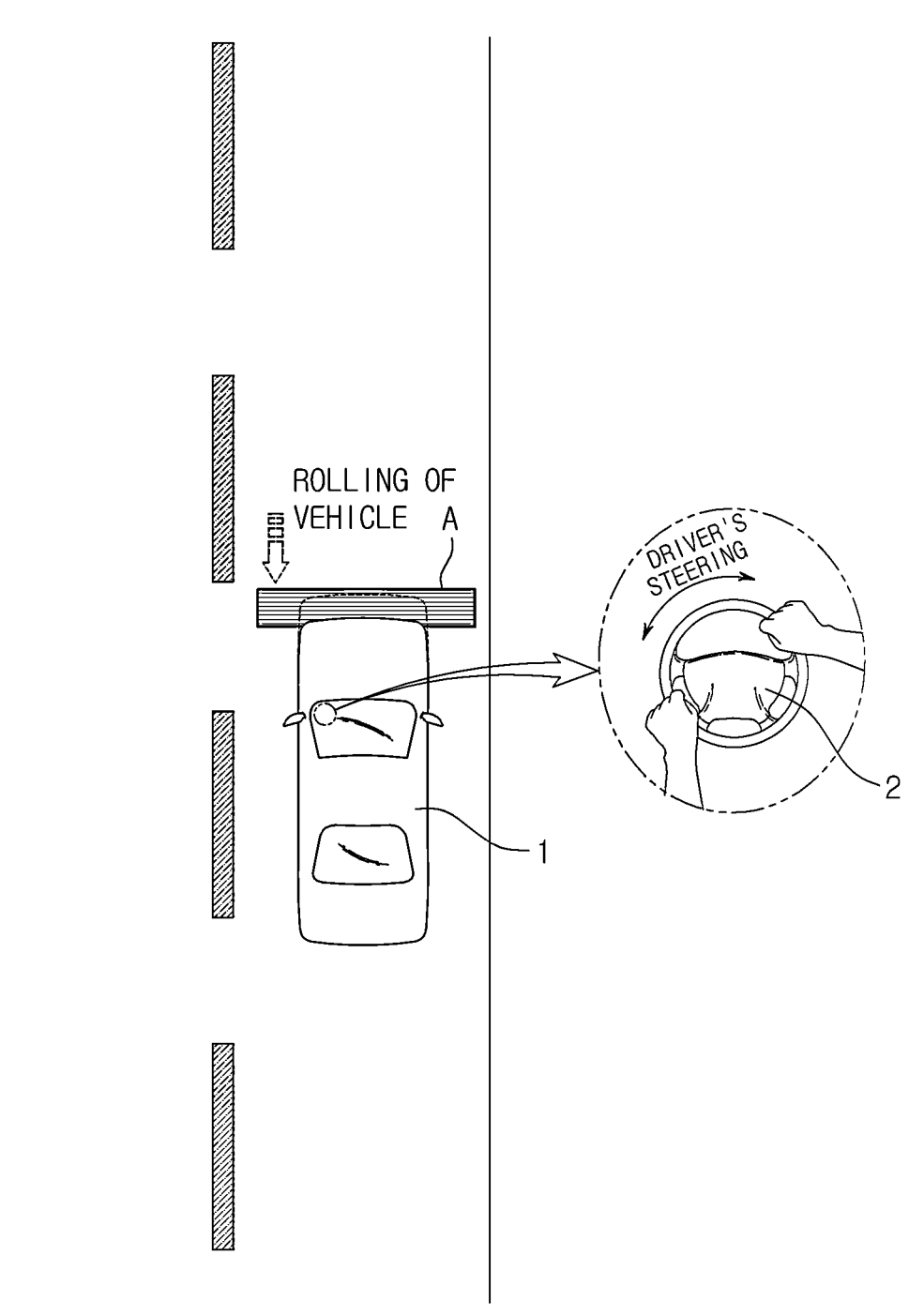
FIG. 9 illustrates another example that a driver's steering intention is confirmed in an EPB system according to an embodiment.

FIG. 9 illustrates another example that a driver's steering intention is confirmed in an EPB system according to an embodiment.

Referring to FIG. 9, the controller 220 may be configured to, upon determining that the steering angle, which is obtained by a driver manipulation of the steering wheel 2 in a situation of the vehicle 1 rolling due to a bump A on a road, is received without receiving the external collision information, determine that the rolling corresponds to a driver's steering intention. The controller 220 may be configured to, upon determining that the steering angle, which corresponds to a driver manipulation of the steering wheel 2 in a situation of the vehicle 1 rolling due to a bump on a road, is received from the steering angle sensor 50, determine that the rolling corresponds to a driver's steering intention.

The controller 220 may be configured to, upon determining that the external collision information is received and the steering angle is received, determine that the rolling does not correspond to a driver's steering intention. The controller 220 may receive steering angle pulses (SP6 and SP7 in FIG. 5) that are not constant over time from the steering angle sensor 50. The controller 220 may determine the steering angle pulse SP7, which has a magnitude larger than that of the steering angle pulse SP6, as corresponding to a steering angle caused by shaking of the vehicle due to an external impact, and determine that the rolling does not correspond to a driver's steering intention.

Figure 10:
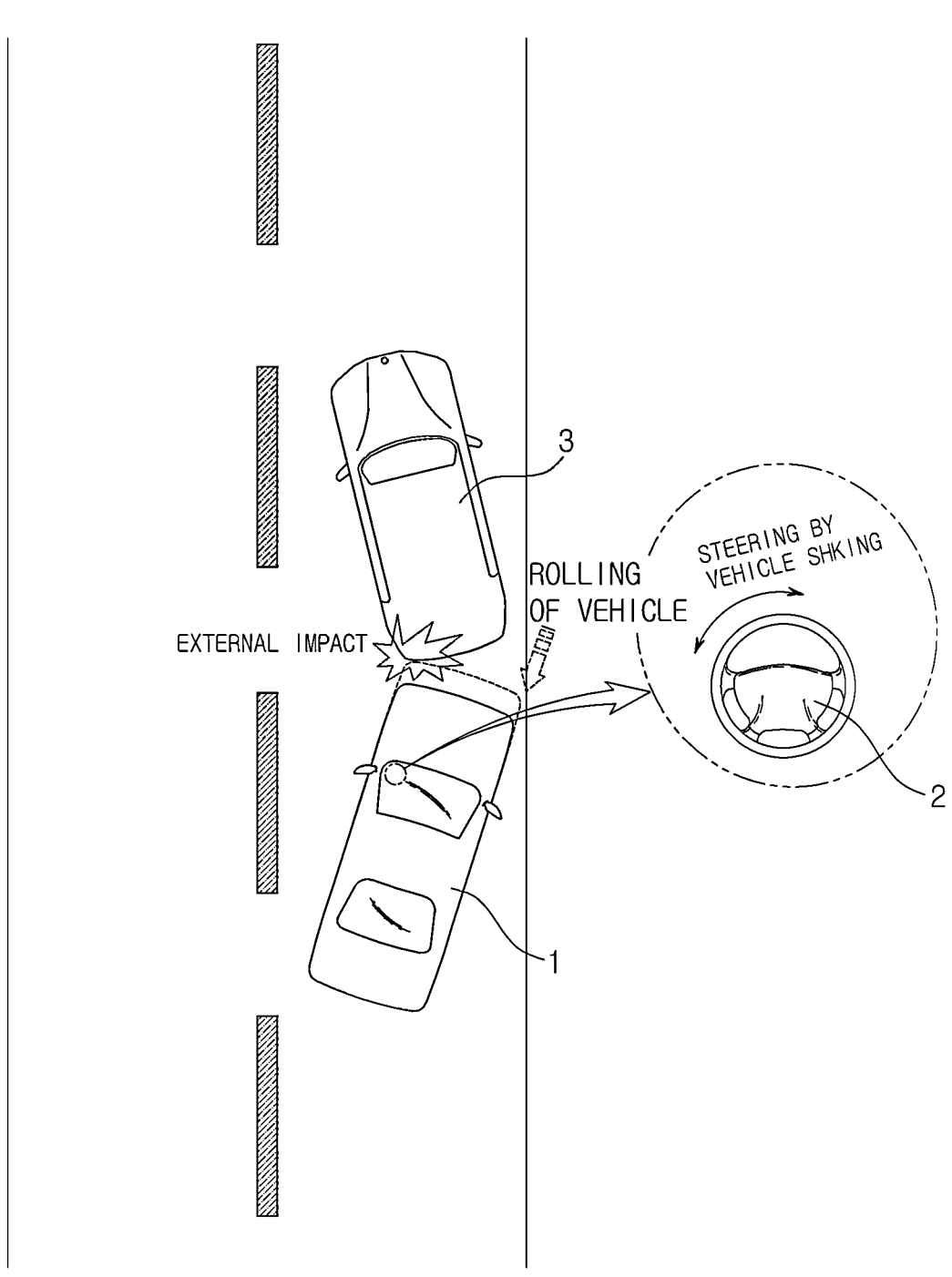
FIG. 10 illustrates an example that a driver's steering intention is not confirmed in an EPB system according to an embodiment.

FIG. 10 illustrates an example that a driver's steering intention is not confirmed in an EPB system according to an embodiment.

Referring to FIG. 10, the controller 220 may be configured to, upon determining that the external collision information is received and the steering angle, which is obtained by a shaking of the vehicle due to an external collision in a situation of the vehicle 1 rolling due to the external collision, is received, determine that the rolling does not correspond to a driver's steering intention. When another vehicle 3 collides with the host vehicle 1 without a driver, the impact sensor 40 may detect a state of colliding with the other vehicle 3. The controller 220 may receive external impact information corresponding to the state of colliding with the other vehicle 3 from the impact sensor 40. The controller 220 may be configured to, upon determining that a steering angle pulse (SP7 in FIG. 5) is received from the steering angle sensor 50 as the steering wheel 2 is manipulated by a shaking of the vehicle 1 due to an external collision in a situation of the vehicle 1 rolling due to the external collision, determine that the rolling does not correspond to a driver's steering intention.

Referring to FIG. 7, the controller 220 may be further configured to, upon determining that the rolling corresponds to a driver's steering intention (YES in operation 650), control the EPB display window 60 such that the warning light of the EPB display window 60 provided in the vehicle cluster is not turned on (651). The controller 220 may transmit a non-lighting signal for not turning on the warning light of the EPB display window 60 to the EPB display window 60, and the EPB display window 60 receiving the non-lighting signal may not turn on the warning light. The EPB display window 60 may not turn on the warning light upon determining that the rolling corresponds to a driver's steering intention.

Referring to FIG. 7, the controller 220 may be further configured to, upon determining that the rolling corresponds to a driver's steering intention (YES in operation 650), control the motor driving unit 210 not to re-clamp the EPB 100 (652). The motor driving unit 210 may stop the driving of the motor 141 to stop the re-clamp operation of the EPB 100.

The controller 220 may determine again whether a driver's steering intention is absent for a predetermined period of time (653). The controller 220 may, upon receiving no steering angle obtained by the driver's manipulation of the steering wheel for the predetermined period of time from the steering angle sensor 50, determine that a driver's steering intention is absent for the predetermined period of time.

The controller 220 may, upon determining that a driver's steering intention is absent for the predetermined period of time (YES in operation 653), transmit a lighting signal for turning on the warning light of the EPB display window 60 to the EPB display window 60 (654). The EPB display window 60 may receive the lighting signal and turn on the warning light. The EPB display window 60 may, upon continuous absence of the driver's steering intention for the predetermined period of time, turn on the warning light. Meanwhile, the controller 220 may, upon determining in operation 653 that a driver's steering intention is present in the predetermined period of time (NO in operation 653), perform operation mode 651 and operation mode 652 again.

The controller 220 may, upon determining that a driver's steering intention is absent for the predetermined period of time (NO in operation 653), control the motor driving unit 210 to re-clamp the EPB 100 (655). The controller 220 may rotate the motor 141 in one direction of the EPB actuator 140 through the motor driving unit 210 so that the inner pad plate 111 pressed by the piston 121 is moved and the friction pad 113 is bought into close contact with the disk D to perform a re-clamping mode that provides a re-clamping force. The motor driving unit 210 may drive the motor 141 to perform a re-clamping operation on the EPB 100. The EPB 100 may generate a re-clamping force according to the driving of the motor 141.

The controller 220 may, upon determining that the rolling does not correspond to a driver's steering intention (NO in operation 650), determines that the rolling corresponds to a steering caused by shaking of the vehicle 1 (660), and further control the EPB display window 60 to turn on the warning light of the EPB display window 60 provided in the vehicle cluster (670).

The controller 220 may transmit a lighting signal for turning on the warning light of the EPB display window 60 provided in the vehicle cluster to the EPB display window 60, and the EPB display window 60 receiving the lighting signal may turn on the warning light. The EPB display window 60 may turn on the warning light when the rolling does not correspond to a driver's steering intention.

The controller 220 may, upon determining that the rolling does not correspond to a driver's steering intention (NO in operation 650), control the motor driving unit 210 to re-clamp the EPB 100 (680). The controller 220 may rotate the motor 141 of the EPB actuator 140 in one direction through the motor driving unit 210 so that the inner pad plate 111 pressed by the piston 121 is moved, and the friction pad 113 is brought into close contact with the disk D to perform a re-clamping mode that provides a re-clamping force. The motor driving unit 210 may drive the motor 141 to perform re-clamping on the EPB 100 at a time t3 (see FIG. 5). The EPB 100 may generate a re-clamping force according to the driving of the motor 141.

Figure 11:
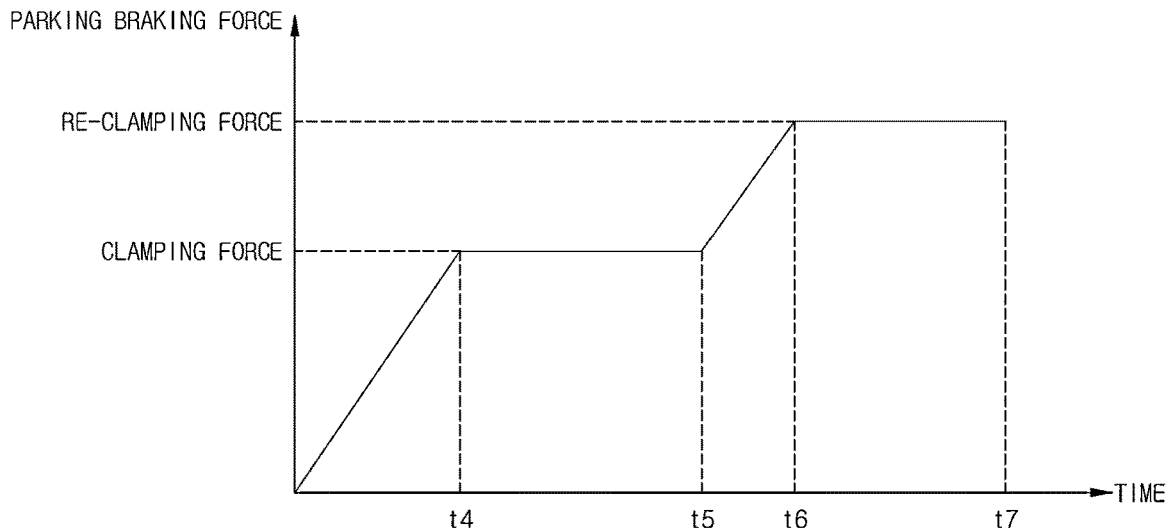
FIG. 11 illustrates a point in time of generation of a re-clamping force of an EPB included in an EPB system according to an embodiment.

FIG. 11 illustrates a time point of generation of a re-clamping force of an EPB included in an EPB system according to an embodiment.

Referring to FIG. 11, the controller 220 may, upon determining that the parking switch 10 is activated before a time t4, control the motor driving unit 210 to perform a parking apply on the EPB 100. The motor driving unit 210 may drive the motor 141 to perform a parking apply on the EPB 100. The EPB 100 may generate a clamping force according to the driving of the motor 141. The EPB 100 may complete the parking apply while maintaining the clamping state of the clamping force during a period of time t4 to time t5.

The controller 220 may, upon a rolling of the vehicle occurring during a period of a time t5 to a time t6, determine whether the rolling does not correspond to a driver's steering intention based on the external impact information and the steering angle, and upon determining that the rolling does not correspond to a driver's steering intention, control the motor driving unit 210 to perform a re-clamping operation on the EPB 100. The controller 220 may, during a period of a time t5 to a time t6, upon determining that a driver's steering intention is absent for a predetermined period of time after a driver's intention, control the motor driving unit 210 to perform a re-clamping operation on the EPB 100. The motor driving unit 210 may drive the motor 141 to perform a re-clamping operation on the EPB 100. The EPB 100 may generate a re-clamping force according to the driving of the motor 141. The EPB 100 may complete the re-clamping operation while maintaining the re-clam ping state of the re-clamping force during a period of a time t6 to a time t7.

The following description will be made on a vehicle in which the re-clamping force of the EPB may be generated only on the front wheel side, the re-clamping force of the EPB may be generated only on the rear wheel side, and the re-clamping force of the EPB may be generated on both the front wheel side and the rear wheel side.

The EPB may generate a re-clamping force required for a re-clamping operation on the front wheel side, the rear wheel side, or on both the front wheel side and the rear wheel side on a road with a slop.

The vehicle 1 may be positioned on a slope road, and the vehicle 220 may, upon a rolling of the vehicle 1 occurring after a parking apply of the EPB 100, determine whether the rolling does not correspond to a driver's steering intention based on the external impact information and the steering angle.

The controller 220 may, upon determining that the rolling does not correspond to a driver's steering intention in a situation of the vehicle 1 rolling based on the external impact information and the steering angle, and that an external impact value of the external impact information is smaller than a predetermined first reference value, determine the front-side EPB to generate the re-clamping force required for re-clamping operation. The controller 220 may transmit a driving command to the motor driving unit 210 such that the rotation of the motor 141 is driven in the re-clamping operation direction to generate a re-clamping force of the front-wheel-side EPB. The motor driving unit 210 may drive the rotation of the motor 141 in the re-clamping operation direction. The front wheel-side EPB may generate a re-clamping force required for the re-clamping operation by the driving of the motor 141.

The controller 220 may, upon determining the rolling does not correspond to a driver's steering intention in a situation of the vehicle 1 rolling based on the external impact information and the steering angle, and that an external impact value of the external impact information is greater than the predetermined first reference value and smaller than a predetermined second reference value, determine the rear-side EPB to generate the re-clamping force required for re-clamping operation. The controller 220 may transmit a driving command to the motor driving unit 210 such that the rotation of the motor 141 is driven in the re-clamping operation direction to generate a re-clamping force of the rear-wheel-side EPB. The motor driving unit 210 may drive the rotation of the motor 141 in the re-clamping operation direction. The rear wheel-side EPB may generate a re-clamping force required for the re-clamping operation by the driving of the motor 141.

The controller 220 may, upon determining the rolling does not correspond to a driver's steering intention in a situation of the vehicle 1 rolling based on the external impact information and the steering angle, and that an external impact value of the external impact information is greater than the predetermined second reference value, determine the front-side EPB and the rear-side EPB to generate the re-clamping force required for re-clamping operation. The controller 220 may transmit a driving command to the motor driving unit 210 such that the rotation of the motor 141 is driven in the re-clamping operation direction to generate a re-clamping force of the front-wheel-side EPB and the rear-side EPB. The motor driving unit 210 may drive the rotation of the motor 141 in the re-clamping operation direction. The front-wheel-side EPB and the rear-side EPB may generate a re-clamping force required for the re-clamping operation by the driving of the motor 141.

As described above, the EPB system 200 according to the embodiment may, upon a rolling of the vehicle 1 after the EPB 100 is clamped, determine whether the rolling corresponds to a driver's steering intention based on the external impact information and the steering angle, and upon determining that the rolling corresponds to a driver's steering intention, prevent the EPB 100 from being re-clamped and upon determining that the rolling does not correspond to a driver's steering intention, allow the EPB 100 to be re-clamped, so that the re-clamping force of the EPB 100 may be accurately generated without applying an excessive load to the EPB 100.

As described above, the EPB system 200 according to the embodiment may, upon a rolling of the vehicle 1 after the EPB 100 is clamped, determine whether a the rolling corresponds to a driver's steering intention based on the external impact information and the steering angle, and upon determining that the rolling corresponds to a driver's steering intention, prevent the warning light of the EPB display window 60 from being turned on, and upon determining that the rolling does not correspond to a driver's steering intention, allow the warning light of the EPB display window 60 to be turned on, so that the re-clamping situation of the EPB 100 may be accurately informed.

On the other hand, the disclosure may also be applied to an electronic brake, such as an electronic-drum, and an electro mechanical brake (EMB).

As is apparent from the above, according to one aspect of the disclosure, a re-clamping force of an EPB can be accurately generated without applying an excessive load to the EPB.

According to another aspect of the disclosure, a re-clamping situation of an EPB can be accurately informed.

What is claimed is:

1. An electronic parking brake (EPB) system for a vehicle and including an actuator of an EPB operated by a motor, the EPB system comprising:

a motor driving circuit configured to drive the motor for parking apply or parking release; and a control circuit electrically connected to the motor driving circuit, wherein the control circuit is configured to:

in response to a parking switch being in an activated state, determine whether an engine is in an off state;

after determining that the engine is in the off state and that the EPB is in a parking apply mode (Apply), monitor a steering angle pulse signal that is transmitted from a steering angle sensor;

upon determining that the steering angle pulse signal is a periodic steering angle pulse signal that is received for a first predetermined time duration, determine that the vehicle is rolling while the EPB is applied;

upon determining that the state vehicle is rolling of while the EPB is applied, determine whether or not to re-clamp the EPB, wherein the control circuit is configured to:

not re-clamp the EPB upon determining that external collision information is not received and that a steering angle, which is obtained by a steering wheel manipulation of the vehicle in a first predetermined situation, is received within a second predetermined time duration, and clamp the EPB upon determining that external collision information is received or that the steering angle is not received within the second predetermined time duration.

2. The EPB system of claim 1, wherein the first predetermined situation corresponds to a situation where the vehicle is rolling over a bump.

3. The EPB system of claim 1, wherein the control circuit is configured to re-clamp the EPB upon determining that the external collision information is received and that the steering angle is received in a second predetermined situation.

4. The EPB system of claim 3, wherein the second predetermined situation corresponds to the vehicle shaking.

5. The EPB system of claim 1, wherein the control circuit is further configured to control an EPB display window provided in a vehicle cluster such that a warning light of the EPB display window is not turned on upon determining that the external collision information is not received and that the steering angle is received within the second predetermined time duration.

6. The EPB system of claim 1, wherein the steering angle pulse signal comprises one of:

a steering angle pulse signal having a constant amplitude within the first predetermined time period, or a steering angle pulse signal having an increasing amplitude within the first predetermined time period.

7. The EPB system of claim 1, wherein the control circuit is further configured to, upon determining that the external collision information is received, control an EPB display window such that a warning light of the EPB display window is turned on.

8. A method of controlling an electronic parking brake (EPB) system by a control circuit, the EPB including an actuator of an EPB operated by a motor of a vehicle, the method comprising:

determining whether a parking switch is activated;

upon determining that the parking switch is activated, determine whether an engine is in an off state;

after determining that the engine is in the off state and that the EPB is in a parking apply mode (Apply), monitoring a steering angle pulse signal that is transmitted from a steering angle sensor;

upon determining that the steering angle pulse signal is a periodic steering angle pulse signal that is received for a first predetermined time duration, determining that the vehicle is rolling while the EPB is applied;

upon determining that the vehicle is rolling while the EPB is applied, determining whether or not to re- clamp the EPB, wherein the method further comprises:

not re-clamping the EPB upon determining that external collision information is not received and that a steering angle, which is obtained by a steering wheel manipulation of the vehicle in a first predetermined situation, is received within a second predetermined time duration; and clamping the EPB upon determining that external collision information is received or that the steering angle is not received within the second predetermined time duration.

9. The method of claim 8, wherein the first predetermined situation corresponds to a situation where the vehicle is rolling over a bump.

10. The method of claim 8, further comprising:

re-clamping the EPB upon determining that the external collision information is received and that the steering angle is received in a second predetermined situation.

11. The method of claim 10, wherein the second predetermined situation corresponds to the vehicle shaking.

12. The method of claim 8, further comprising:

preventing a warning light of an EPB display window provided in a vehicle cluster from being turned on upon determining that the external collision information is not received and that the steering angle is received within the second predetermined time duration.

13. The method of claim 8, wherein the steering angle pulse signal comprises one of:

a steering angle pulse signal having a constant amplitude within the first predetermined time period, or a steering angle pulse signal having an increasing amplitude within the first predetermined time period.

14. The method of claim 8, further comprising:

upon determining that the external collision information is received, turning on a warning light of an EPB display window provided in a vehicle cluster.

* * * * *